Aug. 27, 1963  H. S. BORKOVITZ  3,102,226
POWER CONTROL CIRCUIT
Filed Sept. 18, 1961
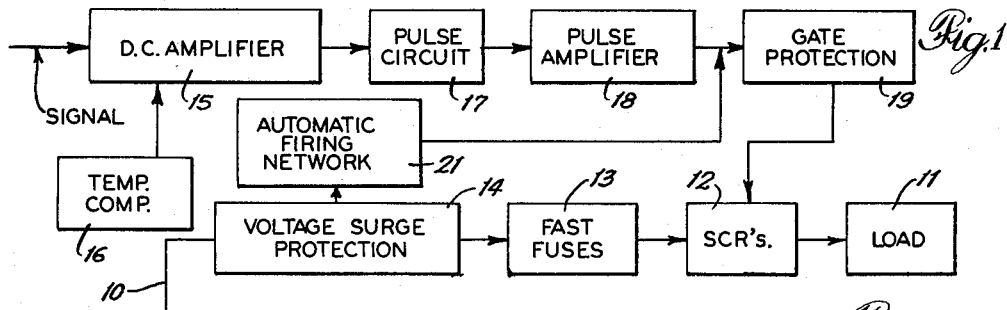
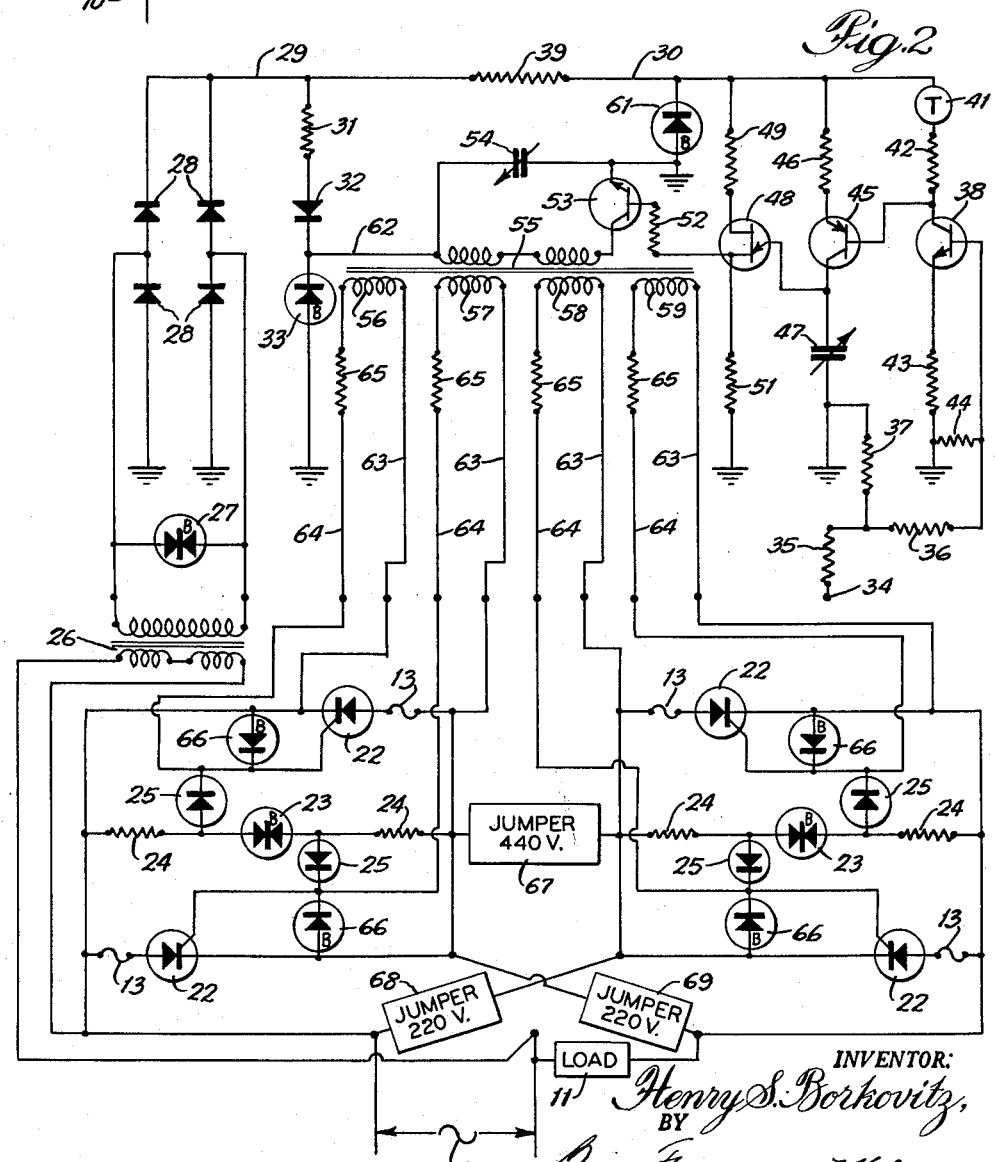
INVENTOR:
Henry S. Borkovitz,
BY
Bair, Freeman & Molinare
ATTORNEYS.

3,102,226
POWER CONTROL CIRCUIT

Henry S. Borkovitz, Chicago, Ill., assignor, by mesne assignments, to Fostoria Corporation, Fostoria, Ohio, a corporation of Ohio
Filed Sept. 18, 1961, Ser. No. 138,885
2 Claims. (Cl. 323—22)

This invention relates to a power control circuit and more particularly to a phase controlled switching circuit for controlling the supply of electric power to loads of various kinds. Phase controlled switching circuits for controlling the supply of power to loads of various kinds, such as resistance heated furnaces, ovens, and the like to maintain a precise temperature therein has heretofore been proposed. In such circuits, and particularly those used with loads having high amperage demand such as 100 amperes at 440 volts or 200 amperes at 220 volts, the load current valves become quite expensive. Semi-conductor rectifiers capable of carrying currents on the order of 150 amperes as used for this purpose are highly advantageous, but are also very expensive.

In the event of high voltage surges on the power line, these valve units are extremely apt to be damaged or burned out completely with the result that there is a substantial loss. In the event of burn-out due to surges on the power line, it becomes necessary to replace the load current carrying valves, and possibly other parts of the circuit, which makes the cost of using such units almost prohibitive.

It is therefore an object of the present invention to provide a power control circuit in which the load current carrying valves are protected against excessive voltage such as voltage surges.

Another object is to provide a power control circuit in which a shunt is provided around the load current carrying valves include a voltage limiting device, such as a Zener diode, to bypass relatively low power, voltage surges.

Another object is to provide a power control circuit in which higher power, voltage surges are utilized to trigger the load current carrying valves to transmit the voltage surges therethrough freely to the load which can normally absorb such surges safely.

According to a feature of the invention, current flow through the shunt circuit generates a voltage across an impedance which is supplied to the control electrode of the load current carrying valve to make the valve conductive. This will not only transmit surges to the load but also functions when two units are connected in series to balance the leakage in the units and to enable one unit to operate as a slave to the other.

A further object is to provide a power control circuit in which pulses for controlling the load current carrying valves are supplied through a transformer having a capacitor and an electrical valve in series with its primary and to which valve the control signal is applied. When this valve becomes conductive the capacitance discharges through the transformer primary to produce a pulse having a sharp front accurately to trigger the load current carrying valves simultaneously.

The above and other objects and features of the invention will be more readily apparent from the following description when read in connection with the accompanying drawing, in which:

FIGURE 1 is a block diagram of a phase controlled power switching circuit embodying the invention; and FIG. 2 is a schematic diagram of the switching control circuit shown in FIG. 1.

Referring first to FIGURE 1, the circuit is powered by a source 10, and supplies a load 11 through one or more semi-conductor controlled rectifiers 12. The semi-conductor controlled rectifiers are connected through fast acting fuses 13 and the voltage surge protection circuit 14 to the other side of the source. The controlling signals are supplied through a D.C. amplifier 15 embodying a temperature compensation device 16 and a pulse circuit 17 to a pulse amplifier 18. From the pulse amplifier the pulses are supplied through a gate protection unit 19 which is connected to the semi-conductor rectifiers to supply controlling pulses thereto.

In operation of the circuit, the semi-conductor rectifiers are normally non-conductive until they are supplied with actuating or trigger pulses through the gate protection circuit 19. The phase position at which the triggering pulses are supplied to the semi-conductor rectifiers will determine the amount of power transmitted thereby during each half cycle of the alternating current thereby to regulate the amount of power supplied to the load. In the event of a voltage surge the voltage surge protection circuit will become effective to bypass the surge and also through the automatic firing network to supply a pulse through the gate protection unit to the semi-conductor rectifiers to trigger them. The surge will therefore be bypassed through the semi-conductor rectifiers to the load where it can normally be absorbed without damage.

The actual circuit is illustrate in FIGURE 2 which shows two double semi-conductor rectifier units connectible through jumpers either in series or in parallel. Each of the units comprises two semi-conductor controlled rectifiers 22 (hereafter in this specification and in the claims referred to as "semi-conductor rectifiers") connected in parallel with each other in opposing relationship between one side of the line and the load. Each of the rectifiers 22 is of conventional construction embodying electrodes between which the load current flows and a control or gating electrode which makes the rectifier conductive in one direction when a positive pulse is applied thereto and when a voltage of the correct polarity is impressed across the load current carrying electrodes. The fuses 13 are connected in series with the semi-conductor rectifiers, as shown, and are of a type which will blow out very quickly to protect the rectifiers against extremely high current surges.

In order to protect the semi-conductor rectifiers against voltage surges a voltage limiting device 23 is connected in shunt therewith and is of a character to conduct current bidirectionally so that it will bypass excess voltages regardless of the phase thereof. As shown, a double diode is preferably employed for this purpose since it has the desired characteristic of being non-conductive below a preset voltage and freely conductive above such voltage. The diode 23 preferably is of a type having the characteristics of a Zener diode such, for example, as the selenium rectifiers sold as Thyrector diodes by General Electric Co. or the volt traps sold by Westinghouse Electric Co. Such devices regardless of their exact structure are referred to herein as Zener diodes. A pair of resistors 24 are connected in series with the voltage limiting device in the shunt circuit on opposite sides of the voltage limiting device to generate a controlling voltage when the voltage limiting device conducts for triggering the semi-conductor rectifiers. For this purpose, rectifiers 25 are connected from the respective control electrodes of the semi-conductor rectifiers to points between the resistors 24 and the voltage limiting devices 23, as shown. When a current is flowing through the bypass circuit in one direction or the other, it will develop a voltage across the resistors which will be transmitted through one or the other of the rectifiers 25 to the control electrode of one or the other of the semi-conductor resistors to trigger it.

Controlling pulses for the semi-conductor rectifiers are supplied from a control pulse circuit illustrated in the upper part of FIGURE 2 which is preferably powered from the source 10 through an isolating transformer 26. The secondary of the transformer 26 preferably is shunted by a bidirectional voltage limiting device 27 which may be a double Zener diode similar to the units 23 and which will tend to bypass voltage surges to keep them out of the pulsing circuit. The secondary of the transformer 26 is connected through a full wave rectifier circuit, including four rectifiers 28 to a line 29 which constitutes the power supply source for the pulsing circuit. The voltage supplied through the line 29 is limited by a bypass to ground including a resistor 39, and a voltage limiting device 61, such as Zener diode and supplies a regulated D.C. power line 30.

The controlling signal such, for example, as a D.C. current supplied by a current proportioning pyrometer or the like, is supplied at a terminal 34 through a matching circuit such as resistors 35, 36 and 37 which are employed to match the input impedance of the pulse control circuit to the signal generating device. The signal is transmitted to the control electrode of an electrical valve 38 illustrated as a transistor which is connected through the resistor 42 and a thermistor 41 for temperature compensation to the regulated D.C. power supply line 30. When a predetermined current is applied to the control electrode of the transistor 38 a current will flow therethrough and through a resistor 43 to ground. Preferably a shunt resistor 44 is connected between the signal input circuit and ground to limit the voltage on the control electrode of the transistor 38 when no signal is applied.

When current flows through the transistor 38, a voltage will be developed across the resistor 42 and thermistor 41 which is transmitted to the control electrode of a second amplifying transistor 45. The transistor 45 is connected to the regulated voltage lead 30 through a resistor 46 and to ground through a capacitor 47. When a control current is supplied to the control electrode of the transistor 45, it will become more or less conductive and will gradually charge the capacitor 47 to produce an increasing voltage. This increasing voltage is supplied to the control electrode of a uni-junction transistor 48 which is connected through a resistor 49 to the supply lead 30 and through a second resistor 51 to ground. When the voltage of the increasing voltage wave supplied from the transistor 45 reaches a predetermined value, it will trigger the uni-junction transistor 48 so that current will be conducted therethrough. This will discharge the capacitor 47 through the resistor 51 to develop a voltage which is transmitted through a resistor 52 to a transistor 53 to trigger it. The transistor 53 is connected in series with a capacitor 54 and with the primary winding of a transformer 55 which is provided with a plurality of secondary windings, there being four such windings 56, 57, 58 and 59, as shown. The common point between transistor 53 and capacitor 54 is connected to ground. The common point between the capacitor 54 and the transformer primary winding is connected through a lead 62 to a point between the rectifier 32 and Zener diode 33. This rectifier 32 is connected through resistor 31 to line 29 to charge capacitor 54.

When voltage surges occur they will be bypassed through the voltage surge protection device 23. If the surges are of high enough power, a voltage will be developed across resistors 24 and will be applied through one or the other of the rectifiers 25 to the control electrodes of the semi-conductor rectifier 22. On high power surges the voltage developed across the resistors and applied to the control electrodes of the semi-conductor rectifiers will be sufficient to fire the ones which are forwardly biased thereby transmitting the surge to the load. The Zener diodes 66 protect the semi-conductor rectifiers from reverse voltage and from excess firing voltage.

The transformer secondary windings 56 to 59 are connected respectively to the several controlled semi-conductor rectifiers 22 to control them. For this purpose, one side of each winding is connected through a lead 63 to the cathode of one of the semi-conductor rectifiers and the other side of each winding is connected through a lead 64 and a resistor 65 to the control electrode of the respective semi-conductor rectifiers. Rectifiers 66, which are Zener type diodes, are connected between the leads 63 and 64, as shown, to bypass negative portions of the signal pulses so that the control electrodes of the semi-conductor rectifiers will receive only the positive signal voltages to trigger them into conduction and also function to limit the value of positive voltage to the control electrodes or gates of the rectifiers 22.

The power circuit units may be connected either in series or in parallel, depending upon the voltage supplied thereto and the output current required. For connecting them in series a jumper 67 interconnects the two semi-conductor rectifier units in series with each other and with the load as shown. With the units connected in this manner, the entire current will pass in series through the two units and the load. Connection of this sort would normally be employed when the supply voltage is at 440 volts and the semi-conductor rectifier units are designed to function at 100 amperes.

In the event that there is a relatively low power surge on the supply line, the double diode 23 will become conductive and will pass the surge without interfering with normal operation of the semi-conductor rectifiers. In the event of a relatively high surge in line, the current passing through the double diode 23 will be sufficient to develop a voltage across the resistors 24 sufficient to trigger one or the other of the semi-conductor rectifiers in each unit so that they will become freely conductive. In this case, the surge will flow through the semi-conductor rectifier units as well as through the shunt bypass and will be absorbed by the load. Normally the load, especially in the case of a resistance electric heated furnace, will be unaffected by a temporary high power surge so that the entire circuit is protected.

Also in case the two units are connected in series by the jumper 67, as described, and in the event there should be a failure in the triggering pulse supplying circuit for one of the units, the arrangement just described will enable that one unit to operate as a slave to the other. Assuming, for example, that the transformer windings 58 and 59, or either of them, become burned out with the units connected in series as soon as the left-hand unit is triggered to become conductive, a high voltage will be impressed across the right-hand unit and will be conducted through the double Zener diode 23. This, as described above, will produce an action similar to a high voltage surge to develop a voltage across one of the resistors 24 sufficient to tripping one or the other of the semi-conductor rectifiers 22 of the second unit so that it will become conductive. Thus the operation will continue in much the same manner as if the desired controlled pulses were being supplied to the second unit.

For connecting the units in parallel as, for example, for 220 volt operation the jumper 67 is omitted and two jumpers 68 and 69 are provided one of which connects one side of the power line to the second unit and the other of which connects the first unit to the load, as shown. With this parallel connection these two units function separately from each other but in parallel with each unit carrying one half of the load current.

While one embodiment of the invention has been shown and described herein, it will be understood that it is illustrative only and not to be taken as a definition of the scope of the invention, reference being had for this purpose to the appended claims.

What is claimed is:

1. A power control circuit comprising a pair of semi-conductor rectifiers each having a control electrode and becoming unidirectionally conductive when a predetermined control voltage is applied to its control electrode, a circuit connecting said rectifiers in opposed parallel relationship to an alternating current source, a double Zener diode connected in shunt across the rectifiers, a pair of resistors connected in series with the Zener diode on opposite sides thereof, connections from points between the resistors and Zener diode to the control electrodes respectively, a transformer having a primary winding and two secondary windings connected to the control electrodes respectively to apply firing voltage pulses thereto, a capacitor and an electrical valve in series circuit with the primary winding, means for supplying a direct voltage to said series circuit, and means to supply a control voltage signal to the electrical valve to make it conductive.

2. A power control circuit comprising an electrical valve having current conductive electrodes and a control electrode, connections to the current conductive electrodes to impress a pulsating voltage thereacross, the valve becoming conductive when a predetermined voltage is applied to the control electrode and a voltage of a predetermined value is impressed across the current conducting electrodes and becoming non-conducting when the voltage across the current conducting electrodes is less than the predetermined value, a voltage limiting device connected across the current conducting electrodes and becoming conductive when the voltage thereacross exceeds a higher predetermined value, an impedance in series with the voltage limiting device, and a connection from one side of the impedance to the control electrode, a transformer having a primary winding and a secondary winding connected to the control electrode to apply a firing voltage thereto, a capacitor and a second electrical valve in series with the primary winding, means to supply a direct voltage to the primary winding circuit to charge the capacitor and supply anode voltage to the second valve, and means to supply a signal voltage to the second valve to cause it to conduct.

References Cited in the file of this patent
UNITED STATES PATENTS 2,875,382    Sandin et al. _____ Feb. 24, 1959
3,042,838    Bedford et al. _____ July 3, 1962

OTHER REFERENCES

Publication-G.E. "Control Rectifier Manual," March 21, 1960, pp. 90–92.

Publication-G.E. "Tunnel Diodes as Amplifiers and Switches," May 1960, ECG–327.